(12) United States Patent
Cartwright et al.

(10) Patent No.: US 9,070,921 B2
(45) Date of Patent: Jun. 30, 2015

(54) SUBZERO AMBIENT SHUTDOWN PURGE OPERATING STRATEGY FOR PEM FUEL CELL SYSTEM

(75) Inventors: Michael Cartwright, Naples, NY (US); Bruce J. Clingerman, North Rose, NY (US); Daniel I. Harris, Honeoye Falls, NY (US); Aaron Rogahn, Rochester, NY (US); Derek R. Lebzelter, Fairport, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 592 days.

(21) Appl. No.: 13/431,703

(22) Filed: Mar. 27, 2012

(65) Prior Publication Data
US 2013/0260185 A1 Oct. 3, 2013

(51) Int. Cl.
*H01M 8/06* (2006.01)
*H01M 16/00* (2006.01)
*H01M 8/04* (2006.01)

(52) U.S. Cl.
CPC .......... *H01M 8/0662* (2013.01); *H01M 16/006* (2013.01); *Y02E 60/50* (2013.01); *H01M 8/04223* (2013.01); *H01M 8/04253* (2013.01)

(58) Field of Classification Search
CPC .......................... H01M 8/0662; H01M 16/006
USPC ........................................ 429/9, 414
See application file for complete search history.

(56) References Cited

U.S. PATENT DOCUMENTS

| | | | |
|---|---|---|---|
| 7,563,526 B2 * | 7/2009 | Takahashi | 429/413 |
| 7,862,935 B2 | 1/2011 | Sinha | |
| 2010/0028728 A1 * | 2/2010 | Clingerman et al. | 429/13 |
| 2010/0151284 A1 | 6/2010 | Burch | |
| 2012/0040258 A1 | 2/2012 | Konrad et al. | |
| 2013/0089797 A1 * | 4/2013 | Falta et al. | 429/414 |

* cited by examiner

*Primary Examiner* — Karie O'Neill Apicella
(74) *Attorney, Agent, or Firm* — John A. Miller; Miller IP Group, PLC

(57) ABSTRACT

A method for purging water from a fuel cell stack at fuel cell system shutdown. The method includes determining a stack water generation request to control the rate of drying of membranes in the stack and determining a cathode catalytic heating water generation request. A maximum charge a battery in the fuel cell system can accept is also determined. An ancillary power request for powering components of the fuel cell system during shutdown is determined. The method allocates how much of the water generation request will be fulfilled by operating the fuel cell stack to charge the battery and to provide the power needed for the ancillary power request, and how much of the water generation request will be fulfilled by cathode catalytic heating that produces water and heat in a cathode side of the fuel cell stack.

20 Claims, 2 Drawing Sheets

SUBZERO AMBIENT SHUTDOWN PURGE OPERATING STRATEGY FOR PEM FUEL CELL SYSTEM

BACKGROUND OF THE INVENTION

1. Field of the Invention

This invention relates generally to a process for controlling the relative humidity of membranes in a fuel cell stack during system shut-down and, more particularly, to a process for providing an optimal purge that causes membranes in a fuel cell stack to rapidly reach desired hydration limits of the membranes.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

As is well understood in the art, fuel cell membranes operate with a certain relative humidity (RH) so that the ionic resistance across the membrane is low enough to effectively conduct protons. The relative humidity of the cathode outlet gas from the fuel cell stack has a strong influence over the membrane relative humidity. By holding a particular set-point for cathode outlet relative humidity, typically 80%, the proper stack membrane relative humidity can be maintained. Stack pressure, stack temperature, cathode stoichiometry and relative humidity of the cathode air into the stack are all controlled parameters to maintain relative humidity at the air outlet. For stack durability purposes, it is desirable to minimize the number of relative humidity cycles of the membrane because cycling between RH extremes has been shown to severely limit membrane life. Particularly, membrane RH cycling causes the membrane to expand and contract as a result of the absorption of water and subsequent drying. This expansion and contraction of the membrane causes pin holes in the membrane, which create hydrogen and oxygen cross-over through the membrane creating hot spots that further increase the size of the hole in the membrane, thus reducing its life.

As mentioned above, water is generated as a by-product of the stack operation. Therefore, the cathode exhaust gas from the stack will include water vapor and liquid water. It is known in the art to recover water from the cathode exhaust stream and return it to the stack via the cathode inlet airflow. Many devices could be used to perform this function, such as a water vapor transfer (WVT) unit.

Further, when the power request for the stack increases, the compressor speed increases to provide the proper amount of cathode air for the requested power. However, when the compressor speed increases, the flow of air through the WVT unit has a higher speed, and less of a chance of being humidified to the desired level. Also, in some fuel cell system designs, the relative humidity of the cathode inlet stream and/or the cathode exhaust stream can be controlled to maintain a set-point by adjusting the temperature of the cooling fluid flow.

During fuel cell system shut-down, it is desirable that the membranes have a certain relative humidity so they are not too wet or too dry. A membrane that is too wet may cause problems for low temperature environments where freezing of the water in the fuel cell stack could produce ice that blocks flow channels and affects the restart of the system. Therefore, it is known in the art to purge the flow channels in the fuel cell stack, typically using compressor air from the compressor to purge one or both of the cathode and anode of the stack. However, too long of a purge could cause the membranes to become too dry where the membranes will have too low of an electrical conductivity at the next system restart that affects restart performance as well as reduces the durability of the stack. Furthermore, it is desirable to purge the fuel cell system such that the membranes reach the desired amount of relative humidity quickly.

SUMMARY OF THE INVENTION

In accordance with the teachings of the present invention, a method for purging water from a fuel cell stack at fuel cell system shutdown is disclosed. The method includes determining a stack water generation request and a cathode catalytic heating water generation request. A maximum amount of charge a battery in the fuel cell system can accept and an ancillary power request for powering components of the fuel cell system during shutdown are further determined. The method also includes allocating how much of the water generation request will be fulfilled by operating the fuel cell stack to charge the battery and to provide the power needed for the ancillary power request, such that by-product water is created, and how much of the water generation request will be fulfilled by cathode catalytic heating that produces water and heat in a cathode side of the fuel cell stack.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a process for controlling a purge of a fuel cell stack at system shut-down is merely exemplary in nature and is in no way intended to limit the invention or its applications or uses.

Figure 1:
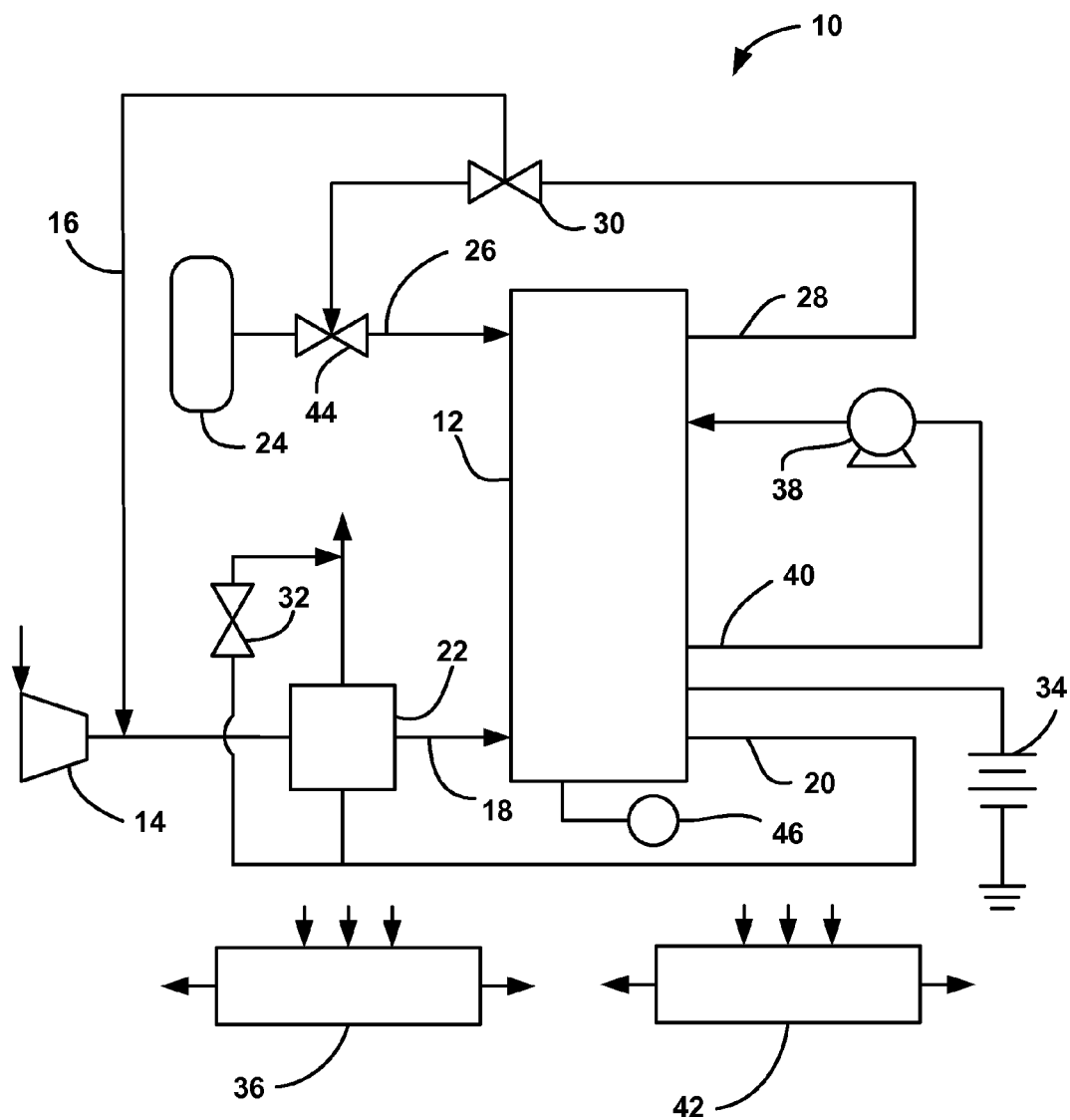
FIG. 1 is a schematic block diagram of a fuel cell system.

FIG. 1 is a schematic block diagram of a fuel cell system 10 including a fuel cell stack 12. The fuel cell system 10 is intended to generally represent any type of fuel cell system that requires an anode exhaust gas bleed to remove nitrogen from the anode side of the stack 12. Examples of such fuel cell systems include fuel cell systems that re-circulate the anode exhaust gas back to the anode inlet and fuel cell systems that employ a split stack design with anode flow-shifting, both of which are referred to herein as an "anode subsystem". A hydrogen source 24 provides fresh dry hydrogen to the anode side of the fuel cell stack 12 on anode input line 26 utilizing an injector 44, such as an injector/ejector, as described in U.S. Pat. No. 7,320,840, "Combination of Injector-Ejector for Fuel Cell Systems," assigned to the assignee of this application and incorporated herein by reference. An anode exhaust gas is output from the stack 12 on an anode recirculation line 28. An anode bleed valve 30 bleeds anode exhaust from the anode recirculation line, as discussed in more detail below.

The system 10 also includes a compressor 14 that provides a cathode inlet airflow on cathode input line 18 to the stack 12. A cathode exhaust gas is output on a cathode exhaust gas line 20 and is routed through a water vapor transfer (WVT) unit 22 provided in the cathode input line 18 or around the WVT unit 22 using a bypass valve 32 to provide a desired amount of humidity to the cathode inlet air flow in a manner that is well understood to those skilled in the art. As is known to those skilled in the art, the moisture for the WVT unit 22 would typically be provided by the cathode exhaust gas. The compressor 14, the cathode input line 18, the WVT unit 22 and the cathode exhaust gas line 20 are all part of a "cathode subsystem". The anode bleed valve 30 bleeds anode exhaust into the cathode input line 18 via a bleed line 16, thereby providing a path for introducing hydrogen into the cathode side of the stack 12, as discussed in more detail below.

The fuel cell system 10 also includes a thermal subsystem for controlling the temperature of the fuel cell stack 12. Particularly, a cooling fluid pump 38 pumps a cooling fluid through a coolant loop 40 outside of the fuel cell stack 12 and cooling fluid flow channels within the fuel cell stack 12. A battery 34 is provided to power the fuel cell system 10 when needed, and the battery 34 is charged by the fuel cell stack 12 at certain times during operation of the fuel cell system 10 in a manner that is well understood to those skilled in the art.

In order to provide high frequency resistance measurements (HFR), the fuel cell system 10 includes a sensor 46 for measuring the resistance of the high frequency component on the stack output, which is provided to a controller 36. The HFR measurement of the stack consists of three additive factors; the electron resistance which consists of bulk material resistance, contact resistance, and the membrane protonic resistance. The controller 36 converts the HFR to a representative value identifying the humidity level in the stack 12 by known calculations. The proton resistance of the membranes in the stack 12 can be determined by subtracting an empirically determined cell contact resistance and bulk material resistance from the measured HFR. The membrane conductivity is then calculated by taking the inverse of the membrane resistance and then multiplying it by the membrane thickness. Using fundamental membrane material characterization data for the membranes in the stack 12, the membrane hydration, or lambda, defined as moles of water per moles of $SOH_3$ in the membrane, can be calculated as a function of measured conductivity and the measured fuel cell stack temperature.

The material limits of dryness of the membranes in the stack 12 are commonly expressed as lambda, a non-dimensional measurement of membrane hydration. In prior fuel cell systems with relatively thick membranes, the lower limit of hydration or lambda was not exceeded to achieve reliable freeze starts when purging the fuel cell stack with traditional methods. In state of the art fuel cell systems, reductions of membrane thickness have significantly limited the duration of the shutdown purge method, discussed in detail below, due to lower limits of lambda or overdrying.

To minimize overdrying of membranes in state of the art fuel cell systems, alternative purge strategies are needed. This can be accomplished in several different ways with a main focus being to increase the cathode inlet RH and stack water generation during the shutdown purge. The fuel cell system 10 includes the WVT unit 22 that transfers a portion of the water leaving the stack 12 to the fuel cell stack cathode inlet air stream, as discussed above. Therefore, increasing stack water generation will raise the stack outlet RH resulting in a higher inlet RH. Another way to generate water in the stack 12 is by using cathode catalytic heating, i.e., hydrogen supplied to the cathode inlet stream, discussed in more detail below.

To achieve reliable freeze start conditions for a stack 12 with fuel cell membranes that are thin, the drying rate of the fuel cell stack 12 needs to be modified such that the distribution of humidity and the level of humidity is optimized based on the characteristics of the materials of the fuel cell stack 12. Implementation may include any combination of increased stack water generation through electrochemical reaction or through catalytic combustion of hydrogen and air, fuel cell stack coolant temperature control or variable shutdown purge cathode air flow. A purge control strategy, discussed in detail below, reduces degradation of the membranes in the stack 12, minimizes shutdown purge fuel consumption, increases freeze start robustness and minimizes shutdown purge time.

To maintain acceptable levels of nitrogen in the anode subsystem of the fuel cell system 10, anode exhaust gas is vented from the anode recirculation line 28 to the cathode inlet line 18 on the bleed line 16. Alternatively, the anode exhaust gas can be vented into the cathode exhaust gas line 20 and a separate line may be used to introduce hydrogen from the anode subsystem to the cathode inlet line 18, as described in U.S. patent application Ser. No. 12/334,007, filed Dec. 12, 2008, "Method and Controls for Hydrogen to Cathode Inlet of a Fuel Cell System," assigned to the assignee of this application and the disclosure of which is incorporated herein by reference. Adding hydrogen to the cathode inlet air stream fuels a catalytic combustion reaction that may be used, for example, to heat the fuel cell system 10 during operation in low ambient environments and to generate water in the cathode side of the fuel cell stack 12.

As stated above, the product of the catalytic combustion reaction is water vapor and heat. If the heat produced in the reaction is removed by cooling (typically by means of conduction through the fuel cell bipolar plate to a liquid coolant) the desired temperature in the fuel cell can be maintained. The added water vapor will increase the relative humidity inside the cathode stream in the fuel cell stack 12, and thus is able to be used to limit the drying of the membranes in the fuel cells of the stack 12 to an acceptable level.

In contemporary fuel cell systems, such as the fuel cell system 10, the power needed to dry the fuel cell system 10 during a shutdown purge is provided by the fuel cell stack 12 to an air machine such as the compressor 14. The electrical current required to generate the power necessary for the shutdown purge is typically very low compared to the cathode air flow rate, i.e., the cathode oxygen stoichiometry is very high. At a high cathode stoichiometry, the equilibrium RH is very low, i.e., the RH of the membrane and flow channels is very low, often resulting in an over-dried membrane. By artificially increasing the fuel cell current through, for example, battery charging and/or by decreasing the cathode air flow during the shutdown purge, the equilibrium RH outlet during the shutdown purge can be increased, resulting in a properly dried membrane. A higher equilibrium RH will limit the minimum lambda measured during shutdown of the fuel cell system 10 because the diffusion media and flow channels will dry out before the membrane. Increased water generation or lower cathode flow result in a higher cathode inlet RH during the shutdown purge, which should extend the life of the membranes in the stack 12. An optimal change in hydration over time may be predetermined or calculated to optimize material durability, system efficiency and/or system performance.

In contemporary fuel cell systems, coolant is typically provided by liquid channels in the fuel cell plate, usually in the direction of cathode flow. By altering the coolant inlet temperature to the stack 12 or the rate of coolant flow through the stack 12 the coolant outlet temperature can be altered, thereby providing a way to manipulate the RH of the cathode subsystem during the shutdown purge. As stated above, a higher equilibrium RH will increase the minimum lambda during a shutdown purge.

Based on prior testing for a given fuel cell stack design, the optimal level of average stack membrane hydration, or lambda, will be defined such that the optimal level allows for robust freeze start performance at all possible ambient temperatures. The optimal level of average stack membrane hydration, lambda, will be the set point that is used during shutdown purges to determine the necessary fuel cell stack product water generation rate.

Based on stack HFR or a stack water buffer model, described in U.S. Pat. No. 7,862,935, "Management Via Dynamic Water Holdup Estimator in a Fuel Cell," assigned to the assignee of this application and the disclosure of which is incorporated herein by reference, feedback from the average membrane hydration or lambda at the start of the shutdown purge is known. With a known starting and ending membrane hydration level as well as a desired rate of change in hydration over time, the desired water generation rate can be calculated from the measured cathode inlet water flow rate and a modeled cathode outlet water flow rate. To solve for the stack water generation rate based on a target level of water in the MEA the following equation is used:

$$mdot_{H2O,StackGen} = \frac{(m_{H2O,target} - m_{H2O,current})}{(\text{Purge Duration} - \text{Current Purge Time})} - (mdot_{H2O,in} - mdot_{H2O,out}) \quad (1)$$

Where $mdot_{H2O,in}$ is calculated by software of the controller 36 and is a function of coolant temperature, air flow, cathode dew point and cathode pressure, and where $mdot_{H2O,out}$ is calculated in the water buffer model and is a function of coolant temperature, air flow, cathode dew point, cathode pressure and stack current, and Purge Duration is defined as $$\frac{(m_{H2O,target} - m_{H2O,startofpurge})}{\left(\frac{dm}{dt_{Target}}\right)}.$$

Since the inlet and outlet water flow rate will be changing over the course of the shutdown purge, the desired water generation set-point will also need to change versus time. To improve control of the water removal rate, a PID controller such as the PID controller 42 may be utilized. The PID controller 42 uses the calculated water generation set point as a starting point or control bias. The second input to the PID controller 42 would be the difference or error between the desired rate of water removal and the actual rate of water removal.

Figure 2:
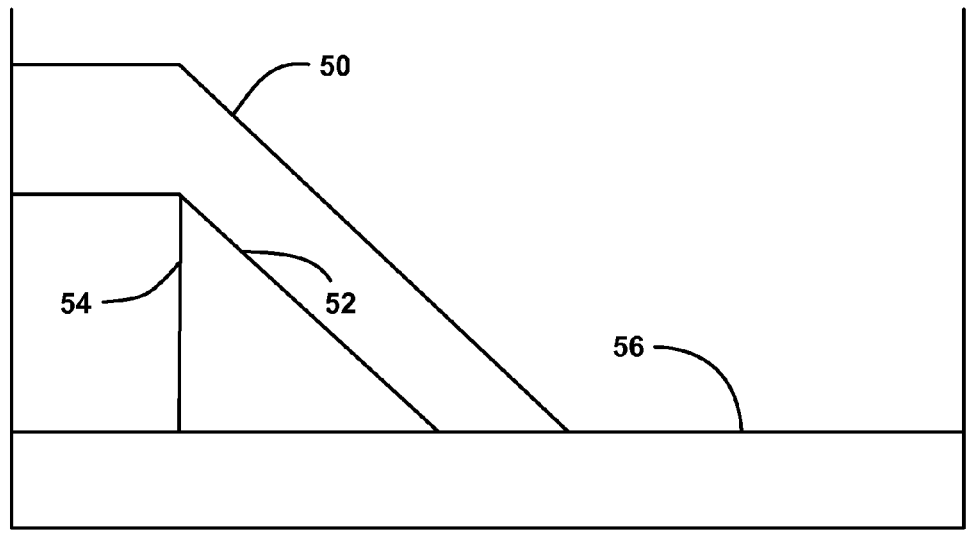
FIG. 2 is a graph with time on the horizontal axis and lambda on the vertical axis illustrating a desired constant rate of drying of membranes in a fuel cell stack.

FIG. 2 is a graph with time on the horizontal axis and lambda on the vertical axis illustrating a desired constant rate of drying of membranes in a fuel cell stack. Line 50 illustrates a wetter starting lambda and line 52 illustrates a drier starting lambda condition. The start of the purge is shown by line 54, and a target lambda for the end of the purge is illustrated by line 56. Both lines 50 and 52 have a constant slope for the change in lambda over time, which is a desirable way to reduce membrane hydration during a stack purge. As is shown in FIG. 2, line 52 reaches the target lambda of 4 before line 50.

During a freeze shutdown purge, described in detail below, additional fuel cell stack water generation can come from, but is not limited to, a combination of two primary sources: (1) fuel cell stack electrical current generation required for battery charging, and (2) hydrogen cathode catalytic heating (CCH) via the introduction of hydrogen to the cathode side of the stack 12. Since the state of charge (SOC) of the battery 34 may be below a desired level, when the fuel cell stack 12 generates water with electrical current the electrical current can be used to increase the SOC of the battery 34. This is the most efficient way to generate water in the fuel cell stack 12 because a percentage of the consumed energy is recovered from the battery 34 during subsequent vehicle usage.

Hydrogen CCH function is utilized during freeze shutdown for two reasons. First, the anode balance of plant (BOP) benefits from CCH by removing water from small passages through increased hydrogen flow and evaporation (due to lower equilibrium RH in the fuel cell stack). This function is particularly beneficial for the anode bleed valve 30, which is used to control the anode hydrogen concentration and is used to supply hydrogen for stack heating to the cathode inlet line 18 in a following low temperature start-up. Second, the battery 34 may be at a maximum SOC and will not allow for any more charging. If the battery 34 is at a maximum SOC, then there is no longer a fuel efficient sink for the additional fuel cell stack current that is used for water generation. In this case, hydrogen CCH can be used to generate the required amount of water instead of fuel cell stack current. Thus, the fuel cell system 10 must be characterized to determine the minimum time and the optimal amount of CCH to clear the anode BOP critical areas.

Figure 3:
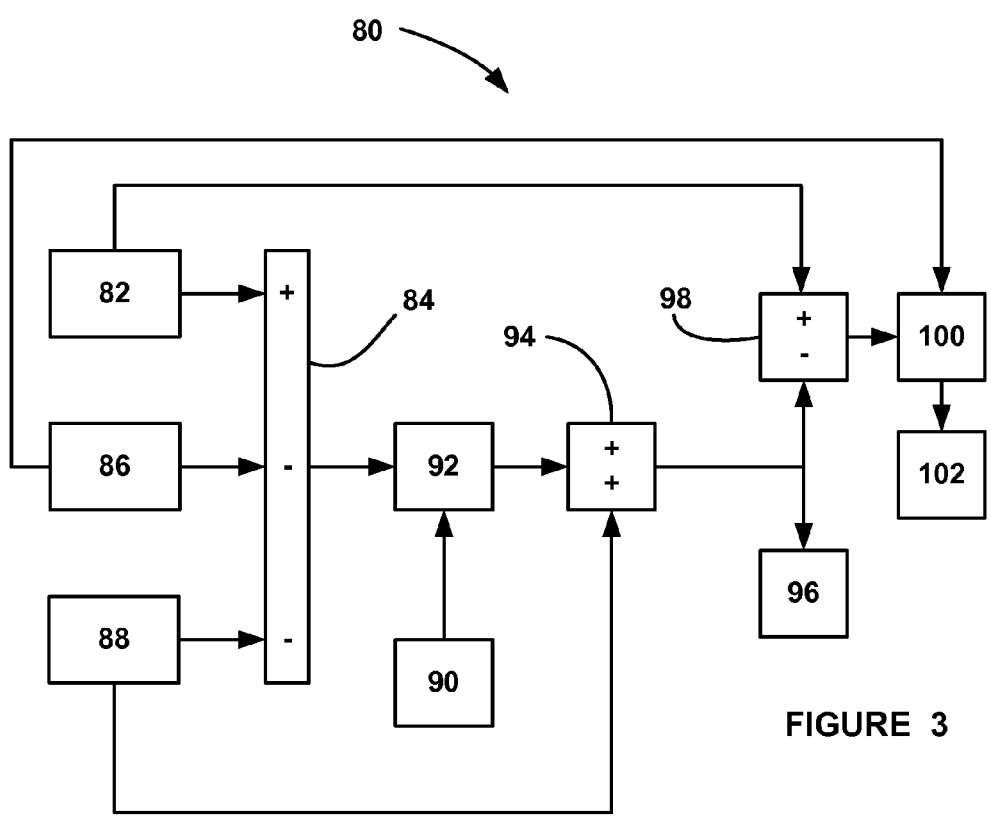
FIG. 3 is a flow diagram for an algorithm for determining a stack water generation request for a stack purge request.

FIG. 3 is a flow diagram 80 of an algorithm for an optimal shutdown purge of the fuel cell system 10. At box 82, a shutdown purge water generation request is received by the controller 36. The shutdown purge water generation request is generated by the PID controller 42, and the water generation request is in terms of the number of moles per second of water that are needed to purge the fuel cell system 10 of excess water while still maintaining an acceptable level of membrane hydration for the membranes in the stack 12 at the box 82.

At box 86, the amount of moles per second of water that are needed from cathode catalytic heating (CCH) to ensure that the anode balance of plant (BOP) is freeze capable is the second input into the algorithm of the flow diagram 80. The amount of CCH needed for the anode BOP and the duration of the CCH for the anode BOP are calibrations that are set depending on fuel cell stack characteristics such as hardware requirements. Typically the amount of moles per second of water that are needed from CCH is set one time for a specific fuel cell system 10 and will remain the same for that system 10 and for every purge. The CCH moles per second of water generation are required to dry the anode BOP. Therefore, this flow will reduce the required amount of water to be generated through an electrochemical reaction in the stack 12 and will be subtracted from the water generation request in a box 84, as is discussed in more detail below.

The third input into the algorithm of the flow diagram 80 is the amount of water generation associated with an ancillary power request for the fuel cell system 10 at box 88, which is the amount of electrical power generated by the stack 12 that will be used by the fuel cell system 10 to operate during the shutdown purge request. The ancillary power related water generation needed will cause water to be generated by operating the fuel cell system 10, discussed in more detail below. Thus, a corrected water generation request, minus the amount of water generated from CCH, minus the amount of water generated from the ancillary power request, is determined at the box 84.

The desired number of moles per second of water from the box 82 is used to determine the current flow through the stack 12 that is needed to produce the desired amount of water, and the determined current flow is an input to a box 84. Because there is a known relationship between current flow through the stack 12 and the number of moles per second of water generated, this relationship can be used to calculate the necessary amount of current flow through the stack 12. If the water generation request at the output of the box 84, meaning that the total stack water generation request minus the CCH and minus the ancillary power request is a negative value, then the output of the box 84 goes to zero and proceeds using a modified purge, discussed in more detail below.

The fourth input into the algorithm of the flow diagram 80 is the water generation associated with fuel cell stack current used to charge the battery 34 at box 90, i.e., the maximum amount of charge that the battery 34 can accept based on its state of charge (SOC). Based on the amount of charge the battery 34 can accept at the box 90 and the determined water generation request at the box 84, the algorithm determines how much of the stack water generation request needs to be fulfilled by charging the battery 34 at box 92 by outputting the minimum value of the box 90 and the box 84.

If it is determined that the water generation request minus ancillary power request and CCH water generation request is above zero at the output of box 84, the amount of water generation requested for the stack 12 corresponds to the combination of ancillary power and battery charging power at box 92. By accepting charge, the battery 34 draws current through the stack 12 that generates a precise amount of moles of water per second. Similarly, the current drawn through the stack 12 that is used to fulfill the ancillary power request generates a precise amount of moles of water per second. Both the amount of moles generated from charging the battery 34 and the ancillary power request are added at box 94. This value corresponds to an output for the algorithm as shown in box 96.

The total electrochemical water generation request from box 94 is compared to the stack water generation request from the box 82 at box 98. If the amount of moles of water from the box 94 is determined at the box 98 to be less than the stack water generation request from the box 82, then the remaining amount of stack water generation for the request must be fulfilled by CCH. To ensure water is adequately removed from the anode balance of plant (BOP), as previously discussed, at a box 100 the algorithm compares how many moles of water per second must be generated using CCH to the amount needed for anode BOP water removal. The maximum of CCH and anode BOP water generation request leaves the box 100 and is used as the algorithm output at box 102 for total CCH water generation request during the purge.

At the start of a purge, conditions of the stack 12 such as temperature and lambda are used to determine the optimal amount of cathode air flow for the duration of each particular purge. While airflow may be changed throughout a given purge to achieve the desired ending lambda, typically airflow is kept constant because the sound of changing airflow is considered less pleasing to a customer/user of the fuel cell system 10. However, if the chosen airflow rate is not providing the desired lambda for the purge, the cathode airflow may be changed as needed. Air flow should be kept as low as possible to avoid drying out the cathode inlet region of the membranes in the stack 12.

Another way to determine the cathode airflow rate for the purge is to determine the desired airflow rate based on water content in the diffusion media, i.e., defined as theta. Because the diffusion media holds more water than the membranes, and because the diffusion media dries out before the membranes, it is possible for the algorithm to use theta to determine cathode airflow for the purge. A higher theta translates to a higher cathode airflow during the purge to achieve the desired amount of membrane humidity within the desired time.

In addition to achieving a desired average fuel cell stack lambda at the end of the purge using the algorithm discussed above, the state of hydration at any given location in the fuel cells of the stack 12 should not fall below a desired level at any time during the shutdown purge. To accomplish the desired uniform hydration in the fuel cells of the stack 12, a water buffer model is used throughout the purge. The water buffer model, described in U.S. Pat. No. 7,862,935 and incorporated herein by reference, models the average membrane hydration level in a four node model down the length of the fuel cells. The water buffer model is used to ensure that the level of hydration at any given location in the fuel cell does not fall below a predetermined desired level. For example, the lambda for node 1 of the water buffer model, which is associated with the cathode inlet region of the fuel cells of the stack 12, is constantly monitored because the cathode inlet region is typically the driest region in the fuel cell stack 12 during a shutdown purge. If the hydration level, or lambda, for node 1 falls below a predetermined minimum level at any time during the purge, additional water generation will be requested by the controller 36. Most of the water generation from CCH occurs in the node 1 region, therefore, the additional water that is requested based on the lambda of node 1, as determined by the water buffer model, will be added to the fuel cell stack 12 using CCH. If the node 1 region does not fall below the predetermined minimum hydration level, the purge continues without additional CCH.

If the water generation request in the algorithm goes to zero at the output of the box 84, as discussed above, meaning the system has no need to generate water because the system is already sufficiently wet and the cells are not drying out, then a control algorithm could be used to increase cathode airflow to purge the stack 12. This control algorithm would use the change in average cell lambda over time as feedback to increase or decrease the cathode airflow to meet the desired rate of change in average lambda.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for purging water from a fuel cell stack at fuel cell system shut down, said method comprising:
    determining a stack water generation request that defines an amount of water generation that is needed from the stack to control the rate of drying of membranes in the stack;
    determining a cathode catalytic heating water generation request that defines an amount and a duration of water generation that is needed from the stack using cathode catalytic heating to purge water from components in an anode balance of plant;
    determining a maximum charge a battery in the fuel cell system can accept;
    determining an ancillary power request for powering components of the fuel cell system during shutdown that defines an amount of ancillary power that is needed to operate components of the fuel cell system during a shut down purge;
    allocating how much of the water generation request is fulfilled by operating the fuel cell system to charge the battery and to provide the power needed for the ancillary power request such that by-product water is created, and how much of the water generation request will be fulfilled by cathode catalytic heating that produces water and heat in a cathode side of the fuel cell stack;
    setting a cathode air flow for the shut down purge;
    monitoring membrane humidity using a water buffer model and/or high frequency resistance measurement during the purge; and
    adapting the amount of water generated and/or the cathode air flow if the membrane humidity is outside of a predetermined range.

2. The method according to claim 1 further comprising determining how much of the stack water generation request is fulfilled by operating the fuel cell stack to charge the battery based on the amount of the ancillary power request and the maximum charge that the battery in the fuel cell system can accept.

3. The method according to claim 2 further comprising determining how much of the stack water generation request is fulfilled by cathode catalytic heating based on the amount of cathode catalytic heating that is needed for the anode balance of plant and based on the amount of the ancillary power request and the maximum charge that the battery can accept.

4. The method according to claim 1 wherein water is purged from the fuel cell stack without generating water when the amount of the stack water generation request is zero.

5. The method according to claim 4 wherein purging water without generating water includes determining an amount of water in membranes of the stack and setting a cathode airflow according to a lookup table so that a desired amount of water is removed from the membranes in the stack.

6. The method according to claim 5 further comprising monitoring the water content in regions of the membranes in the fuel cell stack using a water buffer model and/or high frequency resistance measurement.

7. The method according to claim 6 further comprising adding water to the fuel cell stack using cathode catalytic heating if the water buffer model or the high frequency resistance measurement indicates that the water content in membranes has dropped below a predetermined value.

8. The method according to claim 6 further comprising changing the cathode airflow set-point if the water buffer model or the high frequency resistance measurement indicates that the water content in the membranes has dropped below a predetermined value.

9. A method for purging water from a fuel cell stack at fuel cell system shut down, said method comprising:
    determining a stack water generation request that defines an amount of water generation that is needed from the stack to control the rate of drying of membranes in the stack;
    determining a cathode catalytic heating water generation request that defines an amount and a duration of water generation that is needed from the stack using cathode catalytic heating to purge water from components in an anode balance of plant;
    determining a maximum charge a battery in the fuel cell system can accept;
    determining an ancillary power request for powering components of the fuel cell system during shutdown that defines an amount of ancillary power that is needed to operate components of the fuel cell system during a shut down purge; and
    allocating how much of the water generation request is fulfilled by operating the fuel cell stack to charge the battery and to provide the power needed for the ancillary power request such that by-product water is created and further allocating how much of the water generation request is fulfilled by cathode catalytic heating that produces water and heat in a cathode side of the fuel cell stack.

10. The method according to claim 9 further comprising determining how much of the stack water generation request is fulfilled by operating the fuel cell stack to charge the battery based on the amount of the ancillary power request and the maximum charge that the battery can accept.

11. The method according to claim 10 further comprising determining how much of the stack water generation request is fulfilled by cathode catalytic heating based on the amount of cathode catalytic heating that is needed for the anode balance of plant and based on the amount of the ancillary power request and the maximum charge that the battery can accept.

12. The method according to claim 9 wherein water is purged from the fuel cell stack without generating water when the amount of the stack water generation request is zero.

13. The method according to claim 12 wherein purging water without generating water includes determining an amount of water in membranes of the stack and setting a cathode airflow according to a lookup table so that a desired amount of water is removed from the membranes in the stack.

14. The method according to claim 12 further comprising monitoring the water content in regions of the membranes of the fuel cell stack using a water buffer model and/or high frequency resistance measurement.

15. The method according to claim 14 further comprising adding water to the fuel cell stack using cathode catalytic heating if the water buffer model or the high frequency resistance measurement indicates that the water content in the membranes has dropped below a predetermined value.

16. The method according to claim 9 wherein additional water is generated using cathode catalytic heating if the water buffer model or the high frequency resistance measurement indicates that the water content in the membranes has dropped below a predetermined value.

17. A system for purging water from a fuel cell stack at fuel cell system shut down, said system comprising:
a compressor for providing cathode air flow to a cathode side of the fuel cell stack;
a hydrogen source for providing hydrogen to an anode side of the fuel cell stack;
an anode recirculation loop for recirculating anode exhaust gas to the fuel cell stack;
a battery for providing current to the fuel cell system, wherein the battery may be charged by the fuel cell stack;
a bleed valve in the anode recirculation loop for bleeding the anode exhaust gas to a cathode inlet line so that hydrogen is provided to the cathode side of the stack when cathode catalytic heating is desired; and
a controller configured to determine a stack water generation request that defines an amount of water generation that is needed from the stack and a cathode catalytic heating water generation request that defines an amount and a duration of water generation that is needed from the stack using cathode catalytic heating to purge water from components in an anode balance of plant, said controller also configured to determine a maximum charge that the battery can accept and an ancillary power request for powering components of the fuel cell system during shutdown that defines an amount of ancillary power that is needed to operate components of the fuel cell system during a shut down purge, said controller further configured to allocate how much of the water generation request is fulfilled by operating the fuel cell system to charge the battery and to provide the power needed for the ancillary power request such that by-product water is created, and how much of the water generation request will be fulfilled by cathode catalytic heating that produces water and heat in a cathode side of the fuel cell stack, said controller setting a cathode air flow for the purge, monitoring membrane humidity using a water buffer model and/or high frequency resistance measurement during the purge and adapting the amount of water generated and/or the cathode air flow if the membrane humidity is outside of a predetermined range.

18. The system according to claim 17 wherein said controller is configured to determine how much of the stack water generation request is fulfilled by operating the fuel cell stack to charge the battery based on the amount of the ancillary power request and the maximum charge that the battery can accept.

19. The system according to claim 18 wherein said controller is configured to determine how much of the stack water generation request is fulfilled by cathode catalytic heating based on the amount of cathode catalytic heating that is needed for the anode balance of plant and based on the amount of the ancillary power request and the maximum charge that the battery can accept.

20. The system according to claim 17 wherein said controller is configured to monitor the water content in regions of the membranes of the fuel cell stack using a water buffer model and/or high frequency resistance, and the controller is also configured to cause water to be added to the fuel cell stack using cathode catalytic heating if the water buffer model or the high frequency resistance measurement indicates that the water content in the membranes of the stack have dropped below a predetermined value.

* * * * *